United States Patent [19]
Boyles

[11] Patent Number: 5,467,584
[45] Date of Patent: Nov. 21, 1995

[54] LINE TRIMMER STABILIZER

[76] Inventor: George K. Boyles, P.O. Box 311, Mill Springs, N.C. 28756

[21] Appl. No.: 97,537

[22] Filed: Jul. 27, 1993

[51] Int. Cl.⁶ ........................................................ A01G 3/06
[52] U.S. Cl. ............................................ 56/12.7; 56/16.7
[58] Field of Search ...................................... 56/12.7, 16.7, 56/17.1, 17.2, 12.1; 280/843, DIG. 7

[56] References Cited

U.S. PATENT DOCUMENTS

| | | |
|---|---|---|
| 2,775,857 | 1/1957 | Holmes et al. . |
| 4,149,735 | 4/1979 | Blackburn et al. ................ 280/87.04 |
| 4,572,529 | 2/1986 | Thomas ........................ 280/11.1 BR |
| 4,688,376 | 8/1987 | Wolfe, Sr. ............................. 56/16.7 |
| 4,756,146 | 6/1988 | Rouse . |
| 4,829,755 | 5/1989 | Nance . |
| 4,845,929 | 7/1989 | Kawasaki et al. . |
| 4,873,819 | 10/1989 | Shivers et al. . |
| 4,922,694 | 5/1990 | Emoto . |
| 4,981,012 | 1/1991 | Claborn . |
| 5,092,112 | 3/1992 | Buckendorf, Jr. . |
| 5,095,687 | 3/1992 | Andrew et al. . |
| 5,136,829 | 8/1992 | Sebben et al. ......................... 56/17.2 |
| 5,186,424 | 2/1993 | Shultz et al. ........................... 248/179 |
| 5,207,454 | 5/1993 | Blankenburg et al. ................ 280/843 |
| 5,317,807 | 6/1994 | Pulley ............................... 56/12.7 X |
| 5,351,762 | 10/1994 | Bean .................................. 56/12.7 X |

Primary Examiner—Ramon S. Britts
Assistant Examiner—James A. Lisehora
Attorney, Agent, or Firm—Novak, Druce, Herrmann, Burt

[57] ABSTRACT

A stabilizing roller for a line trimmer device that includes a housing with a cylindrical bore for receiving and mating with a ball roller. The lower end of the housing is open to allow the ball to contact the ground while in operation. The ball is maintained in the housing on the lower end using either an integral lip or a removable retaining plate. The upper end of the housing is closed with a cap designed to mate with the ball during operation. Thus, the ball is free to roll. The housing is connected to a line trimmer device by either a bolt attached to the head of the line trimmer device or a frame and attachment means connected to the extension arm of the line trimmer device.

19 Claims, 3 Drawing Sheets

LINE TRIMMER STABILIZER

BACKGROUND OF THE INVENTION

1. Field of the Invention

This invention relates to a stabilizing mechanism for a line trimmer device. More specifically, it relates to a stabilizer for trimming devices that utilize a rapidly rotating monofilament line. Hereinafter, said trimming devices are collectively referred to as "line trimmer devices" or "line trimmers."

Line trimmer devices are widely used both privately and commercially for lawn care. Generally, these devices use a rapidly rotating monofilament line to cut and remove vegetation or debris. Cutting and dispersement of the vegetation and debris is accomplished by the whipping action of a rapidly rotating line. The line first strikes the vegetation severing it at or near the point of impact and then clears the cuttings from their original position with the whipping action of the line. One commonly known commercial embodiment of such trimmers is a "WEEDEATER."

In most commercial embodiments of line trimmers, the monofilament line is deployed from within a line compartment or hub in which the line is spooled. The hub serves as a means for rotating an extension of the line that protrudes from the hub. In most cases, the hub is rotated by either an electric or gasoline motor. An operator using the trimmer controls the cutting path by way of a handle shaft with spaced handle grips.

Also, in most commercial embodiments of the line trimmers, the cutting head is located at a distal end of the extension handle shaft away from the handle grips. To perform the desired cutting, the cutting head is held and manipulated above, but proximate to the ground at a distance from the user's body. As a result of the cantilevered weight of the line trimmer devices, the user may suffer fatigue and muscle strain in a relatively short time. In addition, vibration of the motor contributes to the fatigue and muscle strain.

Another problem associated with the instability of line trimmer devices is the difficulty in obtaining a uniform cut. People spend a great deal of time and money caring for their lawn. Line trimmer devices have become one of the most important pieces of lawn care equipment because of their versatility and ability to reach places that ordinary lawnmowers cannot gain access. However, due to the vibration and unwieldiness of the line trimmer devices, ordinary people have difficulty maintaining a constant cutting height and uniform cutting path resulting in an unevenly cut lawn. Thus, there is a need for a device to stabilize and support the line trimmer device thereby minimizing fatigue and muscle strain and promoting a more uniform cut. Also, the stabilizer should provide freedom of movement in all directions.

2. Related Art

Numerous efforts have been made to design stabilizing devices for trimming devices. These efforts include U.S. Pat. No. 4,756,146 which issued to Rouse on Jul. 12, 1988. This device includes a string trimmer head with a bulbous extension on the bottom of the head. The bulbous extension is used to guide the head during use, but does not include any rolling means.

Another effort is U.S. Pat. No. 5,095,687 which issued to Andrew, et al. on Mar. 17, 1992. This device consists of a castor wheel attached to the line trimmer device handle shaft using a frame assembly and a clamp.

An additional effort is U.S. Pat. No. 4,981,012 which issued to Claborn on Jan. 1, 1991. This device uses a wheel, frame, and clamp to allow operation of the line trimmer device in a vertical plane.

A fourth prior effort is U.S. Pat. No. 4,873,819 which issued to Shivers, et al. on Oct. 17, 1989. This invention is a grass trimmer that includes a castor wheel assembly integrally attached at the head of the cutter.

Another prior effort is U.S. Pat. No. 4,845,929 which issued to Kawasaki, et al. on Jul. 11, 1989. Like Shivers, this device includes a castor wheel at the head of the cutter.

Other prior efforts include U.S. Pat. No. 4,922,694 which issued to Emoto on May 8, 1990, U.S. Pat. No. 4,829,755 which issued to Nance on May 16, 1989, and U.S. Pat. No. 5,092,112 which issued to Buckendorf, Jr. on Mar. 3, 1992. Each of these devices uses a frame and clamp to attach a two wheeled axis to a line trimmer device.

Finally, U.S. Pat. No. 2,775,857 which issued to Holmes, et al. on Jan. 1, 1957 includes a stabilizing roller attached to the handle of an oscillating blade edger.

In view of the known stabilizing devices, this invention represents an improvement for stabilizing line trimmers and provides a simple, compact, low cost design that permits truly free movement in all directions along the ground's surface. The simple wheel designs do not permit the side-to-side movements typically used in trimming with a line trimmer device. Likewise, the castor wheel designs do not readily maneuver in all directions due to the uneven lawn terrain. Finally, the bulbous extension does not provide for smooth, low-friction movement over the lawn. A modification is the use of a free rolling ball support that allows easy movement in all directions. Consequently, this modification goes beyond the teachings of the prior efforts.

SUMMARY OF THE INVENTION

To achieve such improvements, this invention includes a ball roller encased and held in a housing bore. The ball is exposed to contact the ground and is free to roll in all directions. The ball is held in the housing at the lower end using a retaining plate that can be either permanently or removably attached. The stabilizer may be attached to a line trimmer device in a variety of ways and in a variety of locations. In one embodiment, the stabilizer housing is connected directly to the line trimmer device head. In another embodiment, the housing is attached to the line trimmer device's handle shaft using a mounting arm.

Accordingly, the objectives of this invention are to provide, inter alia, a stabilizing device that:

1. is low cost both in manufacture and application;
2. offers smooth, low-friction rolling in all directions;
3. supports the weight of the line trimmer device to relieve the user from fatigue and muscle strain; and
4. maintains the cutting line at a constant height to provide a uniform cut.

DETAILED DESCRIPTION OF THE INVENTION

Figure 1:
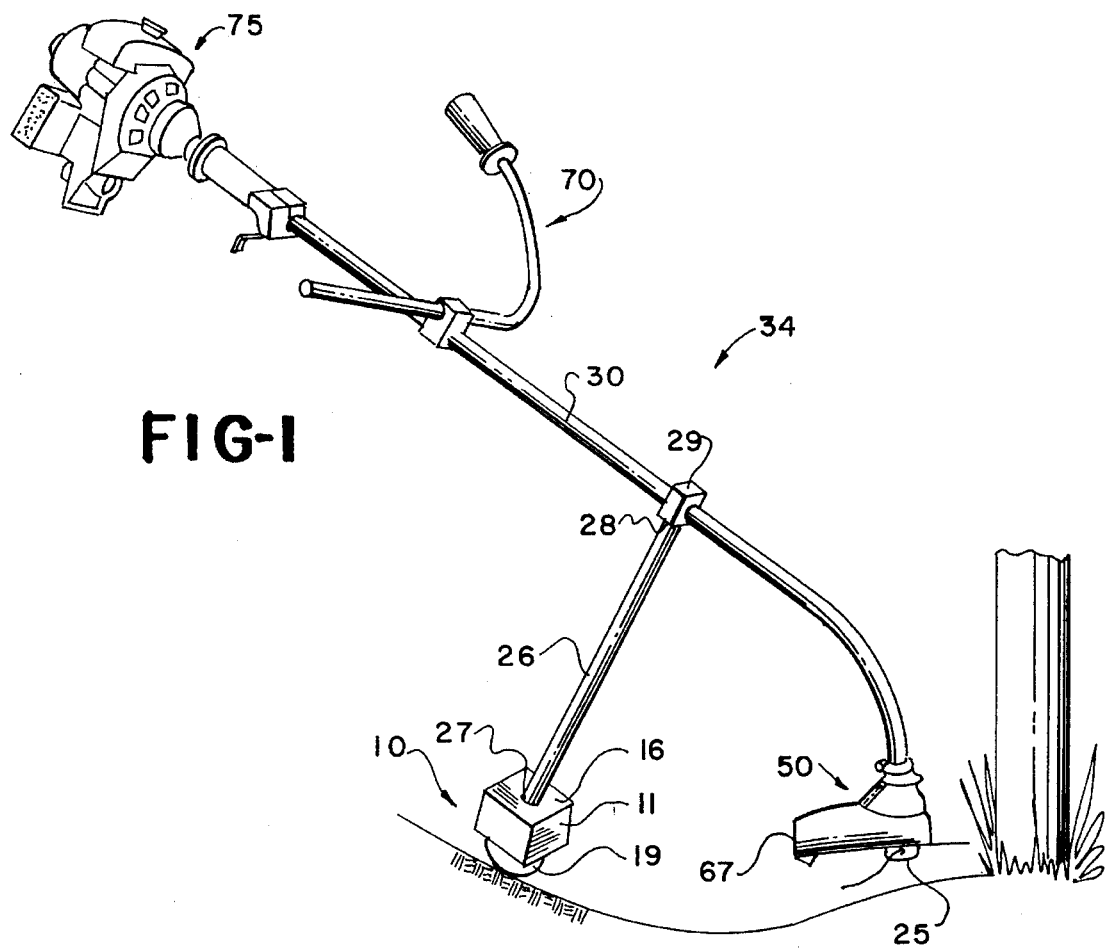
FIG. 1 is a perspective view of the line trimmer device stabilizer assembly attached to a mounting arm where said arm is connected to a handle shaft of an operating, gasoline powered line trimmer device.

FIG. 1 illustrates a conventional line trimmer 34. A cutting head 50 is connected upon a distal end of a handle shaft 30. Handle grips 70 employed by a user to operate and control the trimmer 34 are positioned along the length of the shaft 30. At an upper end of the shaft 30 opposite the cutting head 50, a rotating motor 75 provides the rotation for the cutting head 50.

Figure 2:
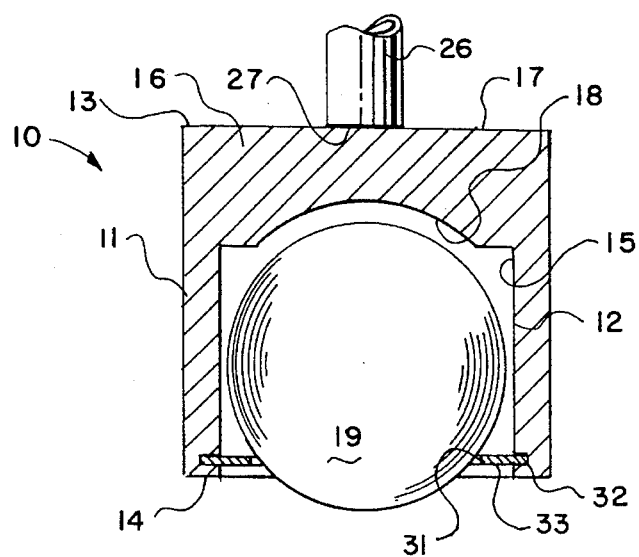
FIG. 2 is a cut-away view showing a partial section of the line trimmer device stabilizer with the ball in its lowest operating position.
Figure 3:
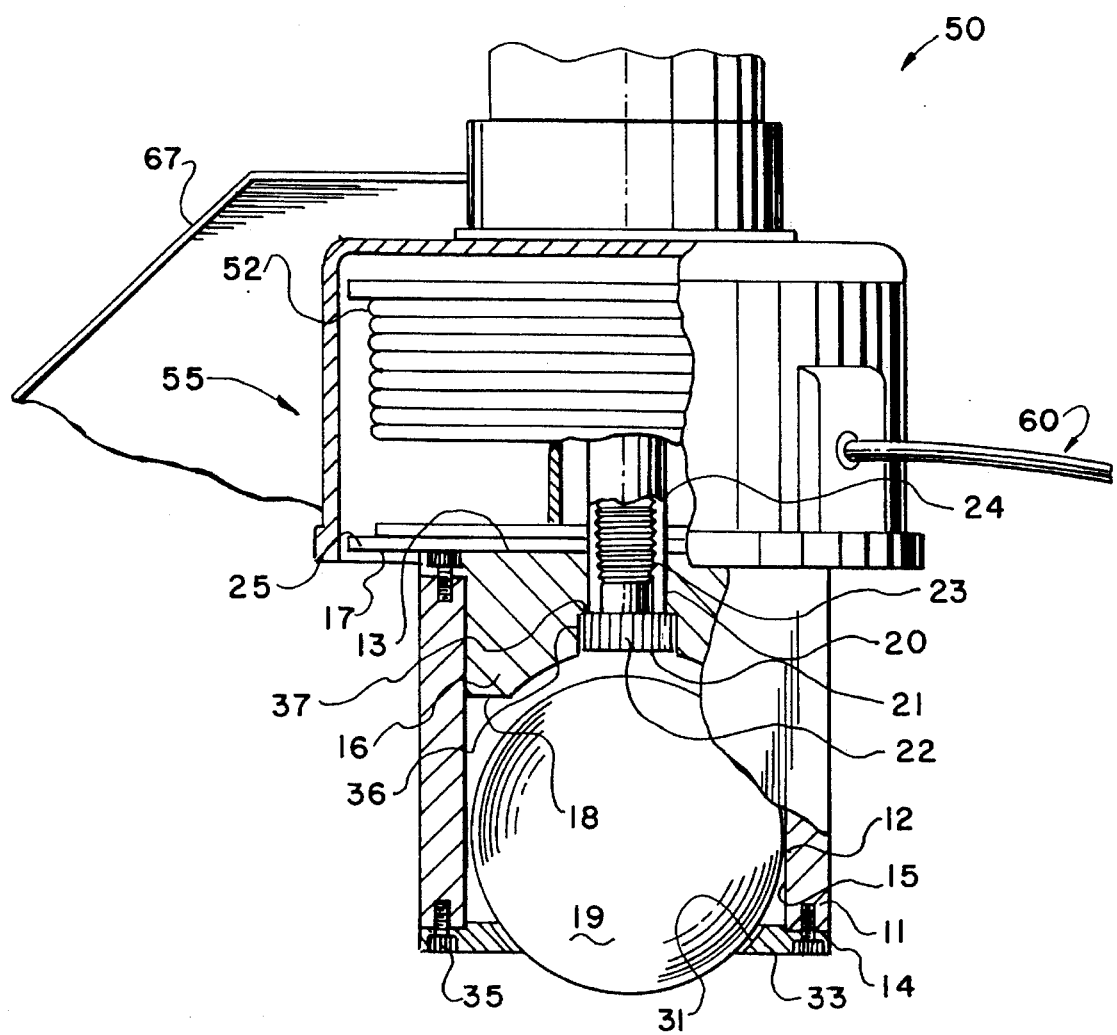
FIG. 3 is a cut-away view showing a partial section of a second embodiment of the line trimmer device stabilizer and its attachment to the head of the line trimmer device and with the ball in its lowest operating position.
Figure 4:
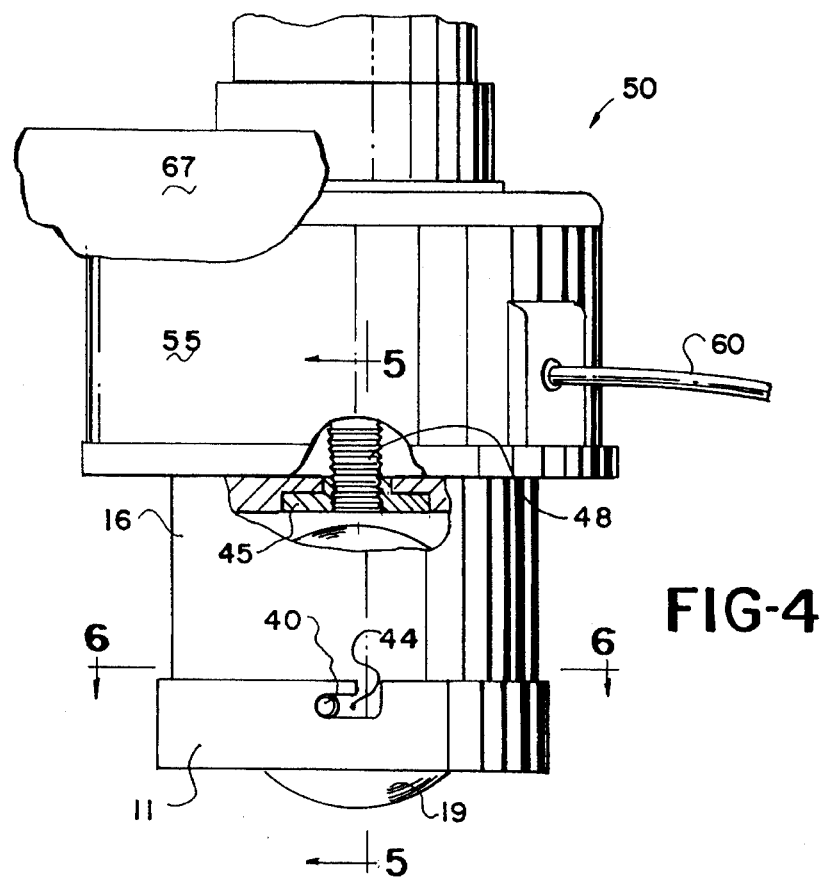
FIG. 4 is a cut-away view showing a partial section of the line trimmer stabilizer and its attachment to the head of the line trimmer device using a threaded female connector and a housing design that uses an upper and lower housing component connected by pins and mating slots.
Figure 6:
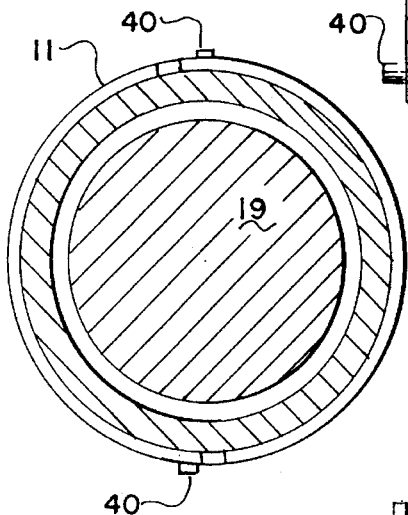
FIG. 6 is a section view taken along lines 6—6 in FIG. 4 of the lower portion of the line trimmer stabilizer to further show the relation of the pins and the slots.
Figure 5:
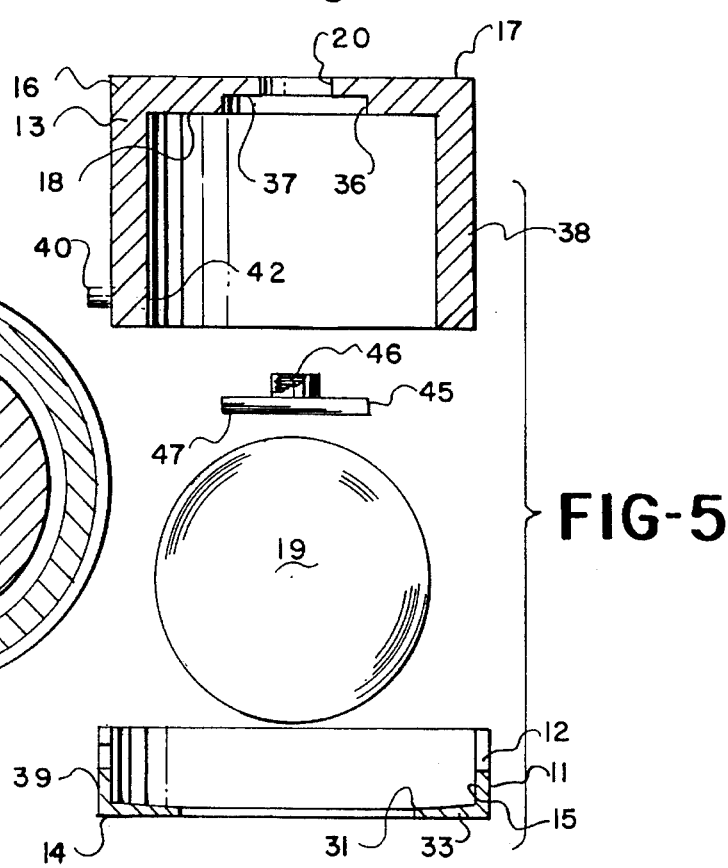
FIG. 5 is a sectioned view taken along lines 5—5 in FIG. 4 of the line trimmer stabilizer. In the this figure, the stabilizer is shown disassembled to more clearly demonstrate how the parts fit together.

Alternate embodiments of this invention are shown in FIGS. 2, 3 and 4. In FIG. 1, a stabilizer assembly 10 is shown attached to a stabilized line trimmer 34 by mounting arm 26. The stabilizer assembly 10 comprises a ball housing 11 that serves as a partial enclosure of a rotatable ball 19. In the preferred embodiment, the housing 11 includes a cylindrical bore 12. It should be understood, however, that the bore 12 may have any cross-sectional shape without departing from the scope of this invention. At a top end 13 of the housing 11 is a top housing cover 16. The top housing cover may be either permanently attached, as in FIG. 2, or removably attached, as in FIG. 3. At a bottom end 14 of the housing 11 is a retaining means in the form of a retaining plate 33, as shown in FIG. 2. A round ball retaining orifice is located substantially at a center of the retaining plate 33 giving the plate 33 a ring shape. An interior edge of the orifice creates a retaining seat 31 upon which the ball 19 rests in the relaxed condition of FIG. 2. It is contemplated that the retaining plate 33 may be connected to the bore 12 in a variety of ways or may be constructed integrally therewith. Three connections are illustrated in the drawings. In FIG. 2, a circular receiving groove 32 is recessed into an interior surface 15 of the bore 12. The retaining plate 33 is installed into the groove 32 and retained therein. In FIG. 3, the plate 33 is bolted to a bottom edge of the housing 11 with small bolts 35. Finally, in FIGS. 4 and 5, the retaining plate 33 is integrally connected to the housing 11.

FIG. 4 illustrates one possible alternative housing 11 design in which the housing 11 is made up of an upper housing 38 and a lower housing 39. The lower housing 39 has an inner diameter slightly greater than the upper housing 38 outer diameter so that the upper housing 38 can be removably disposed in the lower housing 39. The upper housing 38 contains coaxial, radial pin receiving holes 42 positioned substantially near the bottom of the upper housing 38. The lower housing 39 contains receiving slots 44 positioned and designed to receive and mate with pins 40 securably maintained in the upper housing pin receiving holes 42. However, the pins 40 may also be integral with the housing 11. The receiving slots 44 and pins 42 are designed to hold the upper housing 38 and lower housing 39 together during operation of the stabilizer 10.

During operation of the stabilized trimmer 34, the bore 12 is substantially vertically oriented, with a longitudinal centerline of the bore 12 providing a vertical axis for the housing 11. The interior surface 15 of the bore 12 and the lower surface 18 of the cover 16 define an axial cavity within which the substantially spherical ball 19 is retained. The axial cavity is preferably constructed to conform to the shape of the ball 19 when installed therein and accommodate free rotation of the ball 19 within the housing 11. To that end, in the preferred embodiment, the lower surface 18 of the top housing cover 16 has a substantially concave spherical design with a radius similar to, but slightly greater than a radius of the ball 19. In a like manner, a minimum interior diameter of the bore 12 is just greater than the diameter of the ball 19. This configuration provides a clearance between the ball 19 and the interior 15 when said ball 19 is in the relaxed position and resting upon the retaining seat 31 as shown in FIG. 2. As shown therein, said retaining seat 31 has an interior diameter less than the diameter of the ball 19. By this configuration, the stabilizer assembly 10 provides for free rotation of the ball 19, even when said ball 19 is in contact with the interior surface of the housing 11. In order for the stabilizer assembly 10 to operate properly, the ball 19 must stay in contact with the surface of the ground. Therefore, the ball 19 may not recede completely into the axial cavity. To the contrary, the ball 19 must protrude below the retaining plate 33. This is assured by selecting a ball 19 having a size in which the diameter of the ball 19 is greater than the length or depth of the axial cavity measured along the vertical axis of the housing 11.

For the stabilizer assembly 10 to function as intended, said stabilizer 10 must be properly positioned and oriented relative to the cutting head 50 of the trimmer 34. In an operative configuration, proper orientation requires that the stabilizer assembly 10 be substantially vertical so that the ball 19 rests upon the ground's surface when the cutting head 50 is at an appropriate cutting height. Three securing means for achieving the operational configuration are illustrated.

FIGS. 3 and 4 show the stabilizer assembly 10 attached directly to the cutting head 50 using a cooperating cam means. In FIG. 3, attachment is accomplished by bolting the stabilizer assembly 10 to a bottom cap 25 of the cutting head 50. Above the cap 25 is a monofilament compartment 55 in which a supply of monofilament line 52 is contained for radial deployment during rotatable operation of the head 50. An interior of the line compartment 55 contains a monofilament spool upon which monofilament line is wound. Extending from the compartment 55 is cutting line 60 which provides the desired cutting and removal of vegetation and debris. The compartment 55 is conventionally rotated by a rotating means taking the form of either an electric or gasoline motor 75. A flying debris shield 67 will typically be provided to protect the user during operation.

In the embodiments shown in FIGS. 3 and 4, the top housing cover 16 has a bore 20 therethrough with an enlarged recess 36 at a lower end of said bore 20. The recess 36 may have any cross-sectional shape including circular, elliptical, and rectangular, among others. A noncircular recess 36 has an advantage if the attachment means is designed to mate with the recess in order to prevent relative rotation of the attachment means and the stabilizer assembly 10. Reducing the relative rotation of the parts, reduces the part wear.

The attachment means of FIG. 3 is a threaded male connector, or bolt 21, designed to mate with a threaded bore 24 in the bottom cap 25 of the line trimmer head 50. Threaded bore 24 extends into the center of the spool of the compartment 55 through the bottom cap 25. To accomplish attachment of the stabilizer assembly 10 to the cutting head 50, an upper surface 17 of the housing cover 16 is placed adjacent to a lower surface of the bottom cap 25 of the line compartment 55. Each of the adjacent surfaces are constructed for face-to-face abutment. When properly positioned, the bore 20 through the top housing cover 16 of the stabilizer 10 is co-axially aligned with the threaded bore 24 of the line compartment 55. Connection is established by inserting a threaded bolt 21 up through the bore 20 and threadably securing a threaded bolt body 23 of the bolt 21 in the threaded bore 24. In FIG. 3, a head 22 of the bolt 21, or threaded male connector, is contained within the recess 36 and mates with a land surface 37 such that it is completely retained out of the interior cavity of the stabilizer assembly 10. With the bolted connection tightened, the stabilizer assembly 10 rotates together with the line compartment 55 during operation. As a result of the constant rotation of the stabilizer assembly 10 during use in this configuration, a floating action of the ball 19 within the housing 11 is assisted.

The attachment means of FIG. 4 is a threaded female connector 45 designed to mate with a line trimmer cutting head bolt 48. A cutting head bolt 48 extends from the center of the bottom cap 25. To attach the stabilizer assembly 10 to the cutting head 50, the upper surface 17 of the housing cover 16 is pressed against the bottom cap 25 of the line compartment 55. With the stabilizer assembly 10 in the proper position, the cutting head bolt 48 passes through and is substantially coaxial with the top housing cover bore 20. The threaded female connector 45 having a threaded bore 46 threadably engages the cutting head bolt 48 and secures the stabilizer assembly 10 to the cutting head 50. A connector head 47 of the female connector 45 is completely contained within the recess 36 and mates with the land surface 37.

In an alternative embodiment shown in FIGS. 1 and 2, the stabilizer assembly 10 is attached to the line trimmer 34 using a mounting arm 26. The stabilizer assembly 10 is connected to the arm 26 at a stabilizer end 27. The arm 26 is connected to the handle shaft 30 at a shaft end 28 which is distally located to the stabilizer end 27. The connections at both ends 27 and 28 of the arm 26 may be accomplished by any suitable connecting means. It is specifically contemplated that such connecting means may include, inter alia, clamps, brackets, screws, bolts, welds, adhesives, and integral construction. Proper orientation of the stabilizer assembly in this configuration depends upon the shape and length of both the shaft 30 and arm 26, the connection points of the cutting head 50 and the arm 26 to the shaft 30, and the desired cutting height. Proper orientation is easily achieved through design in which these variables are considered.

It will become obvious to one of ordinary skill in the art to substitute other materials and parts for those disclosed herein. Thus, various modifications are possible without departing from the scope of the invention. For example, features of one embodiment may be employed in other embodiments of the invention

What is claimed is:

1. A line trimmer device stabilizer comprising:
   a housing having a cylindrical bore therein, a top end, a bottom end, and a vertical axis;
   said cylindrical bore extending vertically through the housing and having an inner surface;
   a top housing cover attached to said top end of said housing having an upper surface and a lower surface;
   said housing and top housing cover comprising a housing and cover assembly;
   said cylindrical bore inner surface and top housing cover lower surface defining an axial cavity;
   a ball having a substantially spherical shape positioned in the axial cavity;
   said axial cavity designed for rollably receiving and mating with the ball;
   said ball having a diameter less than the cylindrical bore diameter;
   said axial cavity having a vertical axial length greater than the ball radius but less than the ball diameter;
   a retaining means for rollably retaining the ball in the axial cavity; and
   a securing means for attaching the housing and cover assembly to a line trimmer device;
   a bore substantially centrally located through the top housing cover;
   said top housing cover upper surface designed to mate with a line trimmer device bottom cap;
   said top housing cover upper surface positioned to abut and mate with the line trimmer device bottom cap; and
   an attachment means for securing the stabilizer assembly to the line trimmer device bottom cap for rotation therewith.

2. A line trimmer device stabilizer as claimed in claim 1 wherein the attachment means comprises:
   a) a bolt having a bolt head and a bolt body;
   b) said bolt designed to threadably mate with a threaded bore centrally located in a line trimmer device bottom cap;
   c) said top housing cover bore having a diameter greater than the bolt body diameter and less than the bolt head width; and
   d) said bolt positioned through the top housing cover bore and threadably engaging the line trimmer device bottom cap threaded bore.

3. A line trimmer device stabilizer as claimed in claim 2 further comprising:
   a) a cylindrical recess in the top housing cover lower surface substantially coaxial with the top housing cover bore;
   b) said recess defining a land surface designed to receive and mate with the bolt head; and
   c) said recess having an axial depth greater than the bolt head height.

4. A line trimmer device stabilizer as claimed in claim 1 wherein the attachment means comprises:
   a) a female connector having a threaded bore and a female connector head;
   b) said female connector designed to threadably mate with a threaded cutting head bolt centrally located in and extending from the bottom of a line trimmer device bottom cap;
   c) said top housing cover bore having a diameter greater than the threaded cutting head bolt diameter;
   d) said stabilizer assembly positioned such that the threaded cutting head bolt extends through the top housing cover bore; and
   e) said female connector designed and positioned to threadably engage the threaded cutting head bolt.

5. A line trimmer device stabilizer as claimed in claim 4 further comprising:
   a) a cylindrical recess in the top housing cover lower surface substantially coaxial with the top housing cover bore;
   b) said recess defining a land surface designed to receive and mate with the female connector head; and
   c) said recess having an axial depth greater than the female connector head height.

6. A line trimmer device stabilizer as claimed in claim 1 wherein the securing means comprises:
   a) a mounting arm having a stabilizer end and a shaft end distal to the stabilizer end, the stabilizer end having a threaded cutting head bolt centrally located in and extending from the stabilizer end of the mounting arm;
   b) said stabilizer end securely attachable to the stabilizer assembly, the stabilizer assembly having a bore substantially centrally located through said top housing cover, the top housing cover bore having a diameter greater than said threaded cutting head bolt diameter, said top housing cover upper surface capable of mating with and abutting said stabilizer end of said mounting arm when said threaded cutting head bolt is placed therethrough the top housing cover bore for secure attachment of said stabilizer assembly to said mounting arm;
   c) a female connector having a threaded bore and a female connector head, the female connector designed to threadably mate with said threaded cutting bolt located at said stabilizer end of said mounting arm, the female connector engaged with said threaded cutting head bolt; and
   d) said shaft end securely attachable to a handle shaft of a line trimmer device.

7. A line trimmer device stabilizer as claimed in claim 1 wherein the retaining means comprises:
   a) a retaining plate attached to the housing;
   b) said retaining plate located substantially near the housing bottom end; and
   c) said retaining plate having an orifice with an inner diameter less than the diameter of the ball and large enough to allow the ball to extend below the housing bottom end.

8. A line trimmer device stabilizer as claimed in claim 7 wherein the orifice creates a retaining seat in the retaining plate designed to rollably receive and mate with the ball.

9. A line trimmer device stabilizer as claimed in claim 7 wherein the retaining plate is removably attached.

10. A line trimmer device stabilizer as claimed in claim 7 wherein the retaining means comprises:
    a) a receiving groove located substantially near the housing bottom end and disposed in the bore inner surface;
    b) said retaining plate designed to removably mate with the receiving groove;
    c) said receiving groove designed to removably receive and mate with the retaining plate;
    d) said retaining plate having an inner diameter less than the diameter of the ball and large enough to allow the ball to extend below the housing bottom end; and
    e) said retaining plate removably disposed in the receiving groove.

11. A line trimmer device stabilizer as claimed in claim 7 wherein the retaining plate is permanently attached.

12. A line trimmer device stabilizer as claimed in claim 7 wherein the retaining plate is integrally attached.

13. A line trimmer device stabilizer as claimed in claim 1 wherein the top housing cover lower surface is a substantially concave spherical surface.

14. A line trimmer device stabilizer as claimed in claim 1 wherein:
    a) said top housing cover is removably attached to said top end of housing; and
    b) said top end of housing is designed to facilitate removal and insertion of the ball therethrough.

15. A line trimmer device stabilizer as claimed in claim 1 wherein the bore is substantially cylindrical.

16. A stabilized monofilament line trimmer, comprising:
    a line trimmer having a cutting head attached upon a handle shaft;
    a stabilizer assembly mounted directly upon said cutting head for rotation therewith during operation; and
    said stabilizer assembly further comprising:
    a ball housing;
    a substantially spherical ball retained within said ball housing for rotation therewithin; and,
    a portion of said ball protruding from a bottom end of said housing for contact with the ground's surface.

17. The stabilized monofilament line trimmer of claim 16, wherein said ball housing has a depth less than a diameter of said ball thereby assuring that said ball protrudes below said housing at all times.

18. The stabilized monofilament line trimmer of claim 16, further comprising said ball housing having an interior surface conforming to an exterior surface of said ball thereby facilitating free rotation of said ball within said housing.

19. The stabilized monofilament line trimmer of claim 16, wherein said ball housing has a depth less than a diameter of said ball thereby assuring that said ball protrudes below said housing at all times.

* * * * *